A. PFAU.
VALVE DEVICE.
APPLICATION FILED MAR. 24, 1916.
1,332,000.
Patented Feb. 24, 1920.
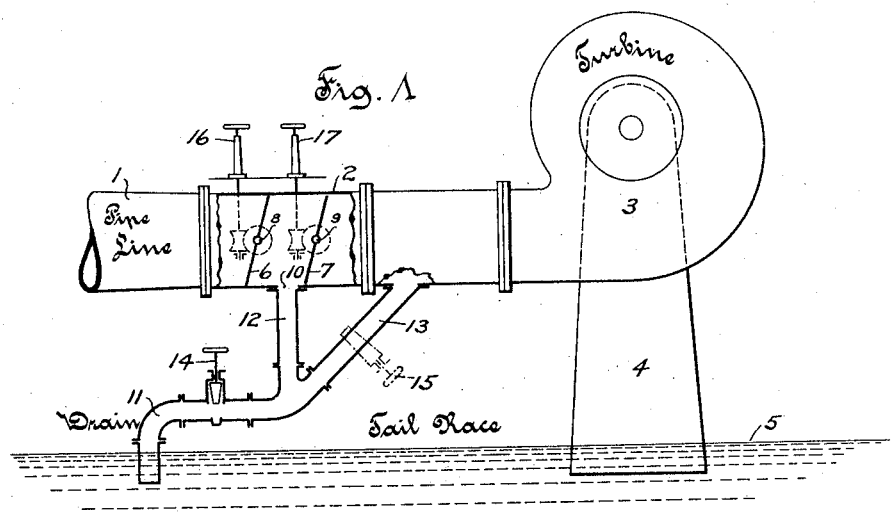
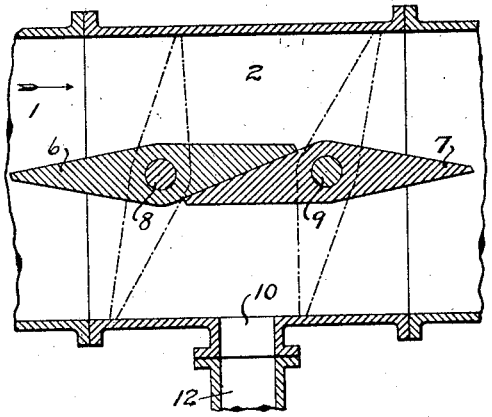
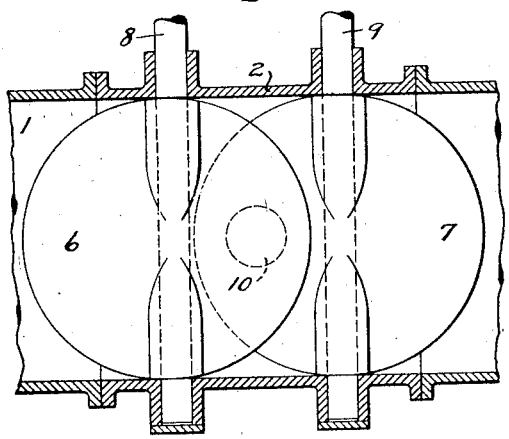

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

VALVE DEVICE.

1,332,000.  Specification of Letters Patent.  Patented Feb. 24, 1920.

Application filed March 24, 1916. Serial No. 87,123.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Valve Devices, of which the following is a specification.

This invention relates to improvements in the construction of valve devices and especially to improvements in the arrangement and construction of butterfly valves whereby such valves may be utilized to effectively cut off the flow of fluid through pipe lines or other conduits.

An object of the invention is to provide a simple and efficient arrangement of valves for effectively preventing the flow of fluid from one portion of a conduit into another portion thereof. One of the more specific objects is to provide a butterfly valve device which is relatively low in cost of installation and which will positively prevent leakage of fluid past the section of a conduit controlled thereby. Another specific object is to provide a butterfly valve construction which will produce minimum obstruction to the flow of water through the conduit.

Valves of the wicket or butterfly type have been found to possess numerous advantages over gate and other types of valves especially when utilized to cut off the flow of fluid through pipe lines or conduits of large diameter. The butterfly valves besides being relatively low in initial cost of construction, may be readily balanced, thus making them subject to least wear and operable with the expenditure of minimum power. One difficulty encountered with the use of butterfly valves when used to cut off the flow of fluid under relatively high pressure, has been the inability to effectively pack the valves when in closed position so as to positively prevent the leakage of fluid past the valves. The present invention contemplates an arrangement and construction of butterfly valves which will positively prevent the leakage of any fluid past the valve controlled section of the conduit and which will permit effective drainage of the portion of the pipe line from which the fluid has been cut off. The invention is especially applicable to hydraulic installations wherein a butterfly valve is utilized to control the flow of fluid to the turbine inlet, and in which it is at times desirable to drain all of the water out of the turbine casing and to prevent the entrance of any water to such casing.

A clear conception of an embodiment of the invention may be had by referring to the drawing accompanying and forming a part of this specification in which like reference characters designate the same or similar parts in the various views.

Figure 1 is a diagrammatic part sectional elevation of an hydraulic turbine installation having the invention embodied therein.

Fig. 2 is an enlarged fragmentary central vertical section through the valve controlled portion of a conduit or pipe line.

Fig. 3 is an enlarged fragmentary central horizontal section through a valve controlled section of a conduit or pipe line.

The hydraulic installation to which the invention is disclosed as applied in Fig. 1, comprises essentially a conduit or pipe line 1 having a valve controlled section 2 therein, and communicating with the inlet gates or nozzle of a turbine 3. The turbine 3 is adapted to discharge its spent fluid through a draft tube 4 to the tail-race 5 in the usual manner.

The valve controlled section 2 of the pipe line 1 is provided with a pair of butterfly valves 6, 7, which are rotatable about horizontal shafts 8, 9, respectively, supported in bearings in the section 2. The axes of the shafts 8, 9, are substantially parallel to each other and are spaced apart a distance somewhat less than the internal diameter of the pipe line section 2. A drainage passage 10 leads from the pipe line section 2 at a point at the bottom thereof and intermediate the shafts 8, 9. This drainage passage 10 communicates with a drain 11 through a drain pipe 12. A second drain pipe 13 discharges into the drain 11, preferably from the lowest point in the casing of the turbine 3 or of the portion of the supply pipe leading thereto. The drain 11 is provided with a suitable cutoff valve 14 and the pipe 13 may also be provided with a cutoff valve 15 if desired. The valve 14 may also be placed in the drain pipe 12 if so desired.

The butterfly valves 6, 7, are independently rotatable about their respective shafts 8, 9, by means of suitable gearing or other mechanism which is operable by the hand-wheels 16, 17, respectively. The disks of the butterfly valves 6, 7, are so formed that with the valves open as disclosed in Figs. 2 and 3, the adjacent portions of the valve disks overlap and engage each other. The disks are preferably also formed so that with the valves open, the leading or left edge of the valve 6 and the trailing or right edge of the valve 7 as viewed in Fig. 2 lie in substantially the same plane which passes through the axes of the valve stems. With this arrangement the valves when open will offer the least obstruction to the flow of fluid past the valves, the amount of obstruction being substantially equal to that produced by a single butterfly valve of ordinary construction when fully opened.

With the valves 6, 7, open as disclosed in Fig. 2, the drain valve 14 should be closed and all of the fluid passing the valves will flow from the pipe line 1 to the turbine 3. If it is desired to cut off the flow of fluid to the turbine 3, the valve 6 should first be closed and the drain valves 14 and 15 should be opened, permitting any water on the turbine side of the valve 6 to flow through the drain 11 into the tail-race 5. The valve 7 should then be closed in order to prevent the flow of fluid which may leak past the valve 6 into the turbine casing. Any such leakage will flow to the lower portion of the pipe line section 2 and will be discharged through the passage 10, pipe 12, and drain 11, directly to the tail-race. In this manner the flow of any fluid to the turbine casing may be effectively prevented even if the valve 6 is not seated perfectly tight.

It has heretofore been proposed to prevent the flow of leakage water to the portion of the pipe line beyond a butterfly valve by manually inserting a dam structure in the pipe line beyond the drain passage 10 after the butterfly valve 6 has been closed. An objection to the use of such a structure, is that the dam structure must be manually inserted, upon closure of the main butterfly valve, by entering the pipe through a manhole. Another objection to the use of such a structure is, that if a high fluid pressure prevails in the main pipe line 1, the velocity of the liquid leaking past the main butterfly valve will be sufficently great to carry some of the leakage beyond the dam structure. With the device of the present invention the flow of leakage water to the turbine casing is readily cut off by manipulating devices which are operable from the exterior of the pipe line, thereby eliminating necessity of entering the interior of the conduit. The device of the present invention permits the use of butterfly valves to effectively prevent leakage of fluid past the valve section irrespective of the fluid pressure, thereby reducing the cost of construction and maintenance to a minimum and securing all advantages attainable by the use of the more expensive gate or other types of valves.

By arranging the valves 6, 7, closely adjacent each other and causing them to overlap and engage each other when open, least possible obstruction to the flow of fluid past the valves, is produced. If the valves were spaced apart a considerable distance and not permitted to overlap, there would be an undesirable double obstruction produced, which with the present arrangement is reduced to a single one.

It should be understood that it is not desired to be limited to the exact details of construction shown and described, for obvious modifications will occur to a person skilled in the art.

It is claimed and desired to secure by Letters Patent:—

1. In combination, a pipe line, and a pair of disconnected overlapping butterfly valves adapted to cut off communication through said pipe line.

2. In combination, a pipe line, and a pair of disconnected butterfly valves for cutting off communication through said pipe line, said valves when closed being spaced apart and when open having overlapping portions.

3. In combination, a pipe line, and a pair of butterfly valves in said pipe line, said valves when open having overlapping portions and the maximum total cross sectional area of both of said valves at said overlapping portions and in a plane at right angles to the axis of said pipe line being no greater than the maximum transverse cross sectional area of either of said valves.

4. In combination, a pipe line, and a pair of independently operable overlapping butterfly valves each adapted to cut communication through said pipe line.

5. In combination, a pipe line, a pair of independently operable overlapping butterfly valves in each adapted to cut off communication through said pipe line, said valves when closed having a confined space between them, and means for draining said space.

6. In combination, a pipe line, a pair of independently operable valves in said pipe line, said valves when closed having a confined space between them, means for conducting fluid from said space away from said pipe line, and a valve for controlling the flow of fluid through said conducting means.

In testimony whereof, the signature of the inventor is affixed hereto.

ARNOLD PFAU.

It is hereby certified that in Letters Patent No. 1,332,000, granted February 24, 1920, upon the application of Arnold Pfau, of Milwaukee, Wisconsin, for an improvement in "Valve Devices," an error appears in the printed specification requiring correction as follows: Page 2, line 110, claim 5, strike out the word "in"; and that the said Letters Patent should be read with this correction therein that the same may conform to the record of the case in the Patent Office.

Signed and sealed this 30th day of March, A. D., 1920.

[SEAL.]

M. H. COULSTON,

*Acting Commissioner of Patents.*

Cl. 251—11.